(12) United States Patent
Kirkpatrick et al.

(10) Patent No.: US 7,373,144 B1
(45) Date of Patent: May 13, 2008

(54) SYSTEM AND METHOD FOR AUTOMATICALLY PROVIDING USER STATUS IN A MESSAGING SERVICE

(75) Inventors: Ficus Kirkpatrick, Palo Alto, CA (US); Jackie Friedman, Seattle, WA (US)

(73) Assignee: Danger, Inc.

( * ) Notice: Subject to any disclaimer, the term of this patent is extended or adjusted under 35 U.S.C. 154(b) by 557 days.

(21) Appl. No.: 10/262,273

(22) Filed: Sep. 30, 2002

(51) Int. Cl.
*H04M 11/00* (2006.01)
*H04Q 7/20* (2006.01)

(52) U.S. Cl. .................................. 455/421; 455/456.1

(58) Field of Classification Search ................ 455/421, 455/456.2, 456.3, 404.2, 456.1; 709/207
See application file for complete search history.

(56) References Cited

U.S. PATENT DOCUMENTS

| | | |
|---|---|---|
| 5,159,592 A | 10/1992 | Perkins |
| 5,278,822 A * | 1/1994 | Yashiki ............ 370/235 |
| 5,537,460 A | 7/1996 | Holliday, Jr. et al. |
| 5,559,800 A | 9/1996 | Mousseau et al. |
| 5,594,910 A | 1/1997 | Filepp et al. |
| 5,715,387 A | 2/1998 | Barnstijn et al. |
| 5,727,202 A | 3/1998 | Kucala |
| 5,778,176 A | 7/1998 | Geihs et al. |
| 5,790,974 A | 8/1998 | Tognazzini |
| 5,802,312 A | 9/1998 | Lazaridis et al. |
| 5,915,095 A | 6/1999 | Miskowiec |
| 5,961,590 A | 10/1999 | Mendez et al. |
| 5,964,830 A | 10/1999 | Durrett |
| 5,982,281 A | 11/1999 | Layson, Jr. |
| 6,023,708 A | 2/2000 | Mendez et al. |
| 6,035,339 A | 3/2000 | Agraharam et al. |
| 6,076,109 A | 6/2000 | Kikinis |
| 6,104,712 A | 8/2000 | Robert et al. |
| 6,151,677 A | 11/2000 | Walter et al. |
| 6,157,935 A | 12/2000 | Tran et al. |

(Continued)

FOREIGN PATENT DOCUMENTS

WO    WO 98/36344    8/1998

(Continued)

OTHER PUBLICATIONS

Excite Home Page, http://www.excite.com/, 1 page Aug. 1, 2000.

(Continued)

*Primary Examiner*—Rafael Perez-Gutierrez
*Assistant Examiner*—My X Nguyen
(74) *Attorney, Agent, or Firm*—Blakely, Sokoloff, Taylor & Zafman, LLP (57) ABSTRACT

A data communication service according to the present invention is capable of tracking a connection status of a wireless device on a wireless network, receiving electronic messages from one or more senders, waiting a period of time for the wireless device to move in contact with the wireless network after the wireless device has moved out of contact with the wireless network, and, maintaining a continuous virtual connection for the period of time. The data communication service is also capable of sending information describing parameters of the connection status to one or more senders, storing messages sent to the wireless device during the period of virtual connection and transmitting the stored messages to the wireless device after the wireless device moves back in contact with the wireless network.

18 Claims, 4 Drawing Sheets

U.S. PATENT DOCUMENTS

| | | | |
|---|---|---|---|
| 6,166,734 | A | 12/2000 | Nahi et al. |
| 6,167,441 | A | 12/2000 | Himmel |
| 6,199,099 | B1 | 3/2001 | Gershman et al. |
| 6,301,609 | B1 * | 10/2001 | Aravamudan et al. ...... 709/207 |
| 6,330,618 | B1 | 12/2001 | Hawkins et al. |
| 6,370,687 | B1 | 4/2002 | Shimura |
| 6,396,482 | B1 | 5/2002 | Griffin et al. |
| 6,418,310 | B1 | 7/2002 | Dent |
| 6,539,232 | B2 | 3/2003 | Hendrey et al. |
| 6,542,748 | B2 | 4/2003 | Hendrey et al. |
| 6,542,749 | B2 | 4/2003 | Tanaka et al. |
| 6,542,750 | B2 | 4/2003 | Hendrey et al. |
| 6,622,175 | B1 | 9/2003 | Piller |
| 6,668,173 | B2 * | 12/2003 | Greene ...................... 455/445 |
| 6,707,378 | B2 * | 3/2004 | MacNeille et al. ......... 340/435 |
| 6,707,890 | B1 * | 3/2004 | Gao et al. ................ 379/88.12 |
| 6,771,971 | B2 * | 8/2004 | Smith ..................... 455/456.1 |
| 6,920,478 | B2 * | 7/2005 | Mendiola et al. .......... 709/203 |
| 2002/0077080 | A1 | 6/2002 | Greene |
| 2002/0101993 | A1 | 8/2002 | Eskin |
| 2002/0115446 | A1 | 8/2002 | Boss et al. |
| 2002/0173308 | A1 * | 11/2002 | Dorenbosch et al. ....... 455/435 |
| 2003/0236086 | A1 * | 12/2003 | Litwin, Jr. ............... 455/412.1 |
| 2004/0203923 | A1 * | 10/2004 | Mullen .................... 455/456.1 |

FOREIGN PATENT DOCUMENTS

| | | |
|---|---|---|
| WO | WO 00/30003 | 5/2000 |
| WO | WO 00/50844 | 8/2000 |

OTHER PUBLICATIONS

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsing, Digital Library Research Group, College of Library and Information Services University of Maryland, pp. 118-125.

Appenzeller, et al., "User-friendly Access Control For Public Network Ports", IEEE, pp. 699-707, Mar. 1999.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services. vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

* cited by examiner

SYSTEM AND METHOD FOR AUTOMATICALLY PROVIDING USER STATUS IN A MESSAGING SERVICE

BACKGROUND

1. Field of the Invention

This invention relates generally to the field of data processing systems. More particularly, the invention relates to an improved system and method for automatically providing status information related to a message recipient.

2. Description of the Related Art

Electronic messaging has become an irreplaceable communication tool in our society. The two most common forms of electronic messaging are electronic mail ("e-mail") and instant messaging.

E-mail provides for the transmission of memos and messages over a network. Within an enterprise, users can send mail to a single recipient or broadcast it to multiple users. E-mail is received and stored in a simulated mailbox in the network mail server or host computer until it is interrogated and deleted. Mail programs query the mail server periodically and notify the recipient if new mail has arrived.

Instant messaging provides for computer conferencing (i.e., a "chat session") over the Internet between two or more people. Messages are transmitted and received in real time. As such, all parties must be online at the same time in an instant messaging session. Users typically generate a list of the names of individuals they want to instant message with, commonly referred to as a "buddy list." When any members of the users' buddy list log on, the users are instantly notified so that they can begin an interactive chat session. AOL's Instant Messenger ("AIM"), Microsoft Network Messenger Service ("MSNMS"), ICQ and Yahoo! Messenger are well known instant messaging services.

When a message recipient is unavailable, different mechanisms exist for notifying the message sender. For example, most e-mail systems allow uses to generate an automatic message response when they will be away from home or the office for an extended period of time (e.g., "I am out of the office from January 1 until January 7; I will respond to your message when I return"). Similarly, many instant messaging systems may automatically notify message senders if a message recipient is offline. In addition, some instant messaging systems allow users to enter a personal automatic reply (e.g., "I am at Karate class").

SUMMARY

A method is disclosed comprising: tracking connection status of a user's wireless device on a wireless network; receiving electronic messages from one or more senders addressed to the wireless device; and providing information related to the connection status to the one or more senders.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for providing detailed message recipient status information via an electronic messaging service. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

A variety of portable/wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

One particular wireless data processing device which operates in conjunction with a data processing service is described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference. Certain aspects of this data processing device and data processing service will now be described, followed by a detailed description of a system and method for automatically providing user status in an electronic messaging service. It should be noted, however, that the underlying principles of the invention are not limited to the specific service set forth in the Network Portal Application.

Figure 1:
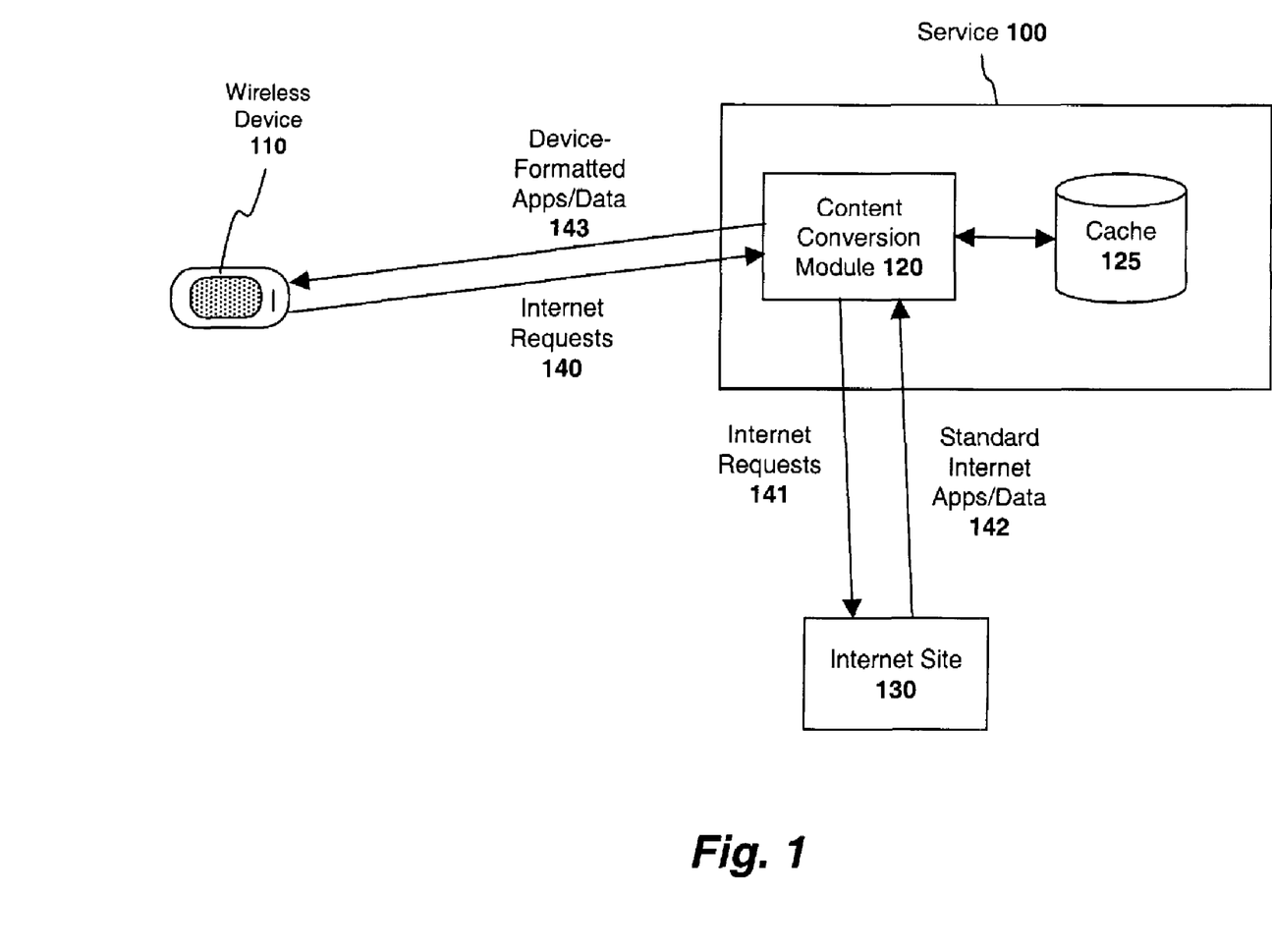
FIG. 1 illustrates one embodiment of a data processing service communicating with a data processing device.

FIG. 1 illustrates one embodiment of a data processing service 100 comprised of one or more servers. The data processing service provides a portal through which data processing devices 110 may access content (e.g., Web pages, multimedia content, e-mail, instant messages . . . etc) from external Internet sites 130. In one embodiment, the service 100 converts standard applications and data into a format which each wireless data processing device 110 can properly interpret. Thus, as illustrated in FIG. 1, one embodiment of the service 110 includes a content conversion module 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 142 into a format which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the wireless device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a relatively low power microprocessor or microcontroller, thereby lowering the cost of manufacture and/or the energy consumed by the device 110.

In one embodiment, when a particular Web page or other Internet object has been converted into a format suitable for rendering/execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Various caching techniques and algorithms may be implemented to ensure that the cache 125 is storing Internet data efficiently (i.e., resulting in an acceptable percentage of cache 'hits') and that the data is current. For example, the service 100 may cache the most frequently-requested Internet data (e.g., the Yahoo™ home page), and may remove content from the cache based on a least-recently used caching policy. In addition, to ensure that data stored in the cache is current, the service 100 may compare the version of the data stored in the cache 125 with the version of data stored at the remote Internet site 130 when the data is requested. Similarly, the service 100 may store data in the cache 125 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

One embodiment of the data processing device 110 may support audio communications as well as (or in lieu of) data communications. In fact, the underlying principles of the invention are not limited to any particular type of wireless communication.

Automatic User Status

Figure 2:
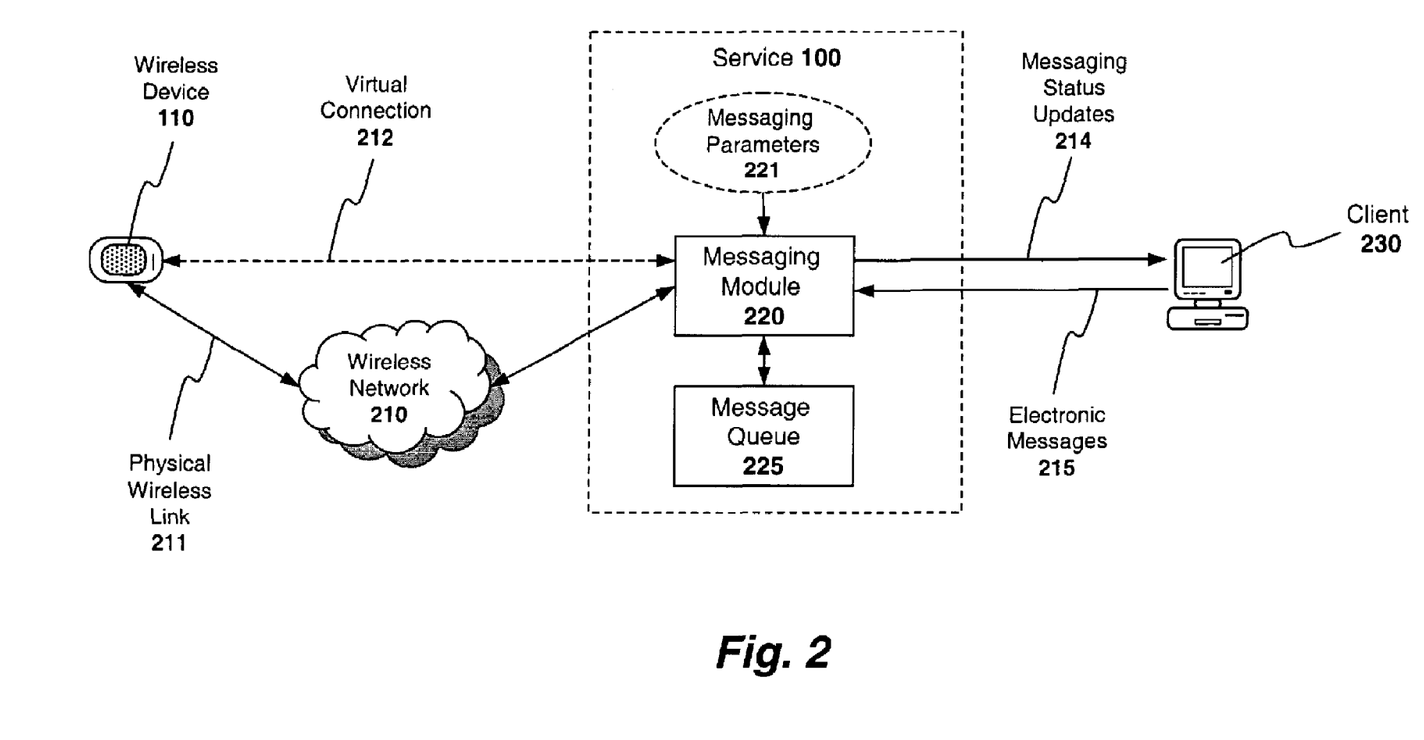
FIG. 2 illustrates one embodiment of a system and method for disabling a data processing device.

One embodiment of the service 100, illustrated in FIG. 2, is comprised of an electronic messaging module 220 which coordinates message passing between the wireless device 110 and other wireless and non-wireless data processing devices (e.g., such as client 230 illustrated in FIG. 2). The messaging module 220 operates in accordance with a set of user-selectable or service-selectable messaging parameters 221.

When a user of the wireless device 110 is logged in to the service 100 to receive instant messages, the messaging module 220 forwards instant messages from other clients 230 to the wireless device 110 via the wireless network 210. Conversely, the wireless messaging module 220 forwards instant messages transmitted from the wireless device 110 to message recipients logged in on the various clients 230. The wireless messaging module 220 coordinates instant messaging sessions with any number of logged in users. The other clients 230 with which the wireless device 110 communicates may be any type of data processing devices capable of sending and receiving instant messages over a network (e.g., other wireless devices, desktop/notebook personal computers communicatively coupled to a local area network or a digital subscriber line, personal digital assistants, . . . etc).

Due to the inherently mobile nature of the wireless device 110, it may periodically come in and out of contact with the wireless network 210 (i.e., the wireless link 211 may not be completely reliable). For example, if the user enters a tunnel, elevator or otherwise travels through an out-of-coverage area, the wireless device 110 may be temporarily incapable of sending or receiving instant messages. In prior instant messaging systems, the message sender would simply receive a message indicating that the user was offline, or would receive no indication whatsoever.

However, in one embodiment of the invention, the messaging module 220 maintains a continual virtual connection 212 to the wireless device 110, even when the device 110 temporarily moves out of contact of the wireless network 210. While the wireless device 110 is out of coverage, the messaging module 220 stores any messages addressed to the wireless device 110 in a temporary message queue 225. As soon as the service 100 detects that the wireless device 110 is back online, the messages in the message queue 225 are forwarded to the wireless device 110. In one embodiment, the wireless device 110 includes a similar message queue for temporarily storing outgoing instant messages until communication with the network 210 is reestablished.

In one embodiment, because the service 100 continually tracks the current status of the device 110, the messaging module 220 may provide detailed user status information to the various message senders. For example, when the device is temporarily out of contact, rather than merely sending a message that the device 110 is "offline," or sending no indication whatsoever, the messaging module 220 transmits an indication that the device has temporarily moved out of contact. Similarly, if the device has been out of contact for an extended period of time, the messaging module 220 may log the user off of the messaging session and transmit an indication that the device 110 is offline.

Figure 3:
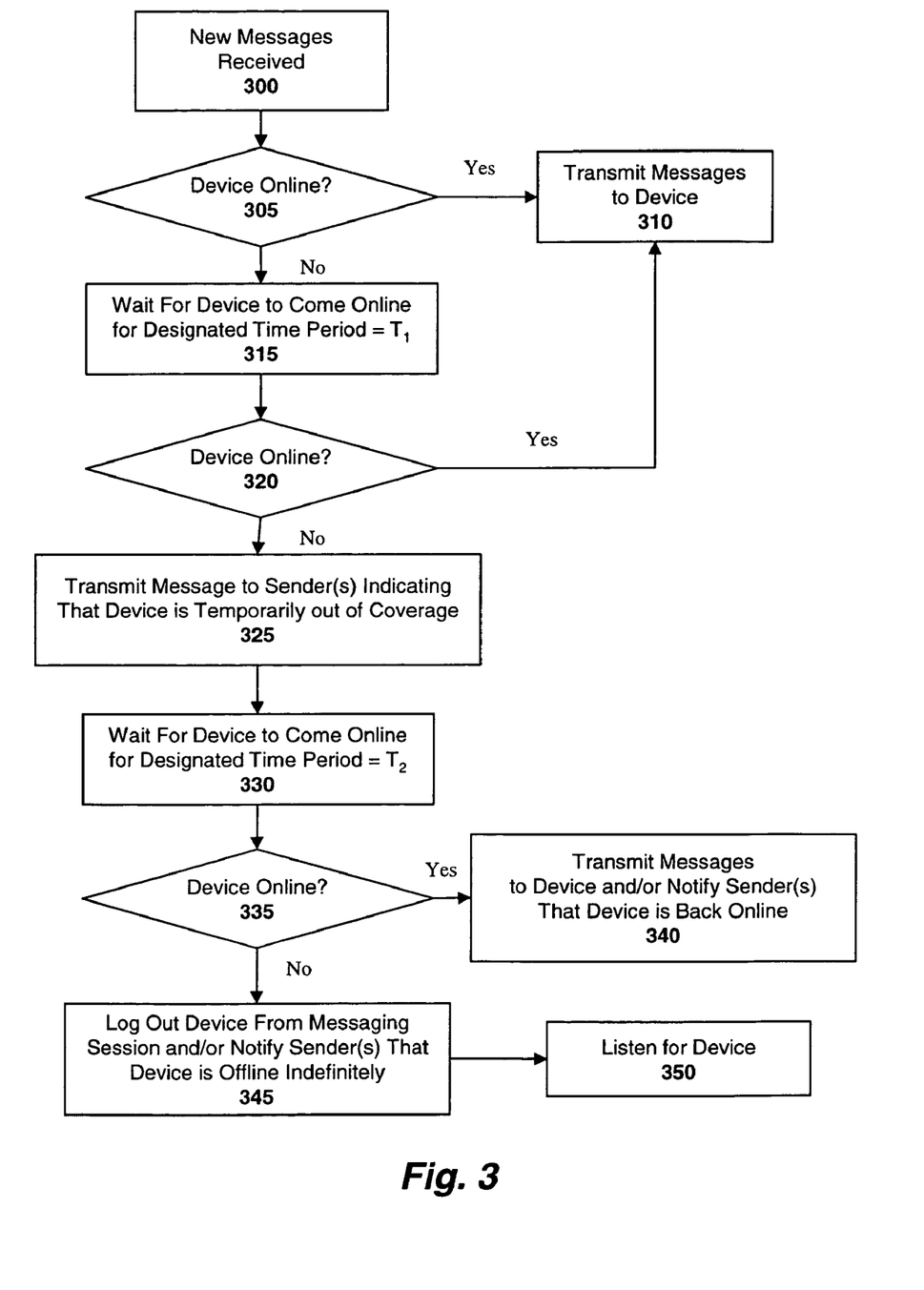
FIG. 3 illustrates a message on the display of a disabled data processing device.

One embodiment of a messaging process implemented by the messaging module 220 is illustrated in FIG. 3. The illustrated messaging process is based on one particular set of user-selected and/or service-selected messaging parameters 221. Of course, various alternate messaging parameters may be executed by the messaging module 220 while complying with the underlying principles of the invention.

At 300 new instant messages addressed to the wireless device 110 of a user who is currently logged in to a messaging session are received at the service 100. If the device is online, determined at 305, then the messages are simply transmitted to the device at 310. If, however, the wireless device 110 is not currently online (e.g., having recently gone out of coverage) then the messaging module 220 will wait a period of time ($T_1$) for the device to come back online. During this period of time the messages may be temporarily stored in the message queue 225.

If the wireless device 110 comes back online during this period, determined at 320, then the messages are sent to the device at 310. If, however, the device is still out of coverage following this time period then, at 325, the messaging module 220 sends a message to the sender(s) indicating that the device is temporarily out of coverage and/or that the sender(s) messages will be delivered when the device 110 comes back into coverage.

The messaging module 220 then waits for the wireless device 110 to come back online for a second period of time ($T_2$), which may be greater than, less than or equal to the first time period, depending on the selected messaging parameters 221. If the device comes back online during the second time period, determined at 335, then at 340, the queued messages are transmitted to the device 110 and/or the sender(s) are notified that the messages have been transmitted.

If, however, the device 110 does not come back online during this second time period, then, at 345, the messaging module 220 logs the user/device out from the messaging session and/or notifies the other participants in the session that the device is offline indefinitely. The service 100 then listens for the device, at 350, as it normally would when the device is out of coverage. When the device finally reconnects to the service 100, any queued messages may be transmitted to the device 110. In addition, any users still logged in to the messaging session may be notified accordingly.

In one embodiment, the user may program the messaging module 220 to perform any combination of the foregoing messaging techniques or none of the foregoing techniques. For example, the user may not want anyone to know that he/she is communicating wirelessly and, as such, may not want an indication to be sent that the wireless device 110 is temporarily out of coverage.

In one embodiment, the user of the wireless device 110 may specify which message senders should receive detailed status information and which message senders should not. For example, a user may choose to send detailed status data such as that described above only to close friends and family. For all other message senders, the user may only want an indication to be transmitted that the user is offline, or may want no indication to be transmitted whatsoever.

Location-Based Status Updates

One embodiment of the invention may be employed in conjunction with the location-based instant messaging techniques described in U.S. Pat. No. 6,714,791 entitled SYSTEM, APPARATUS AND METHOD FOR LOCATION-BASED INSTANT MESSAGING, Ser. No. 09/792,547, Filed Feb. 23, 2001, which is assigned to the assignee of the present application and which is incorporated herein by reference.

Figure 4:
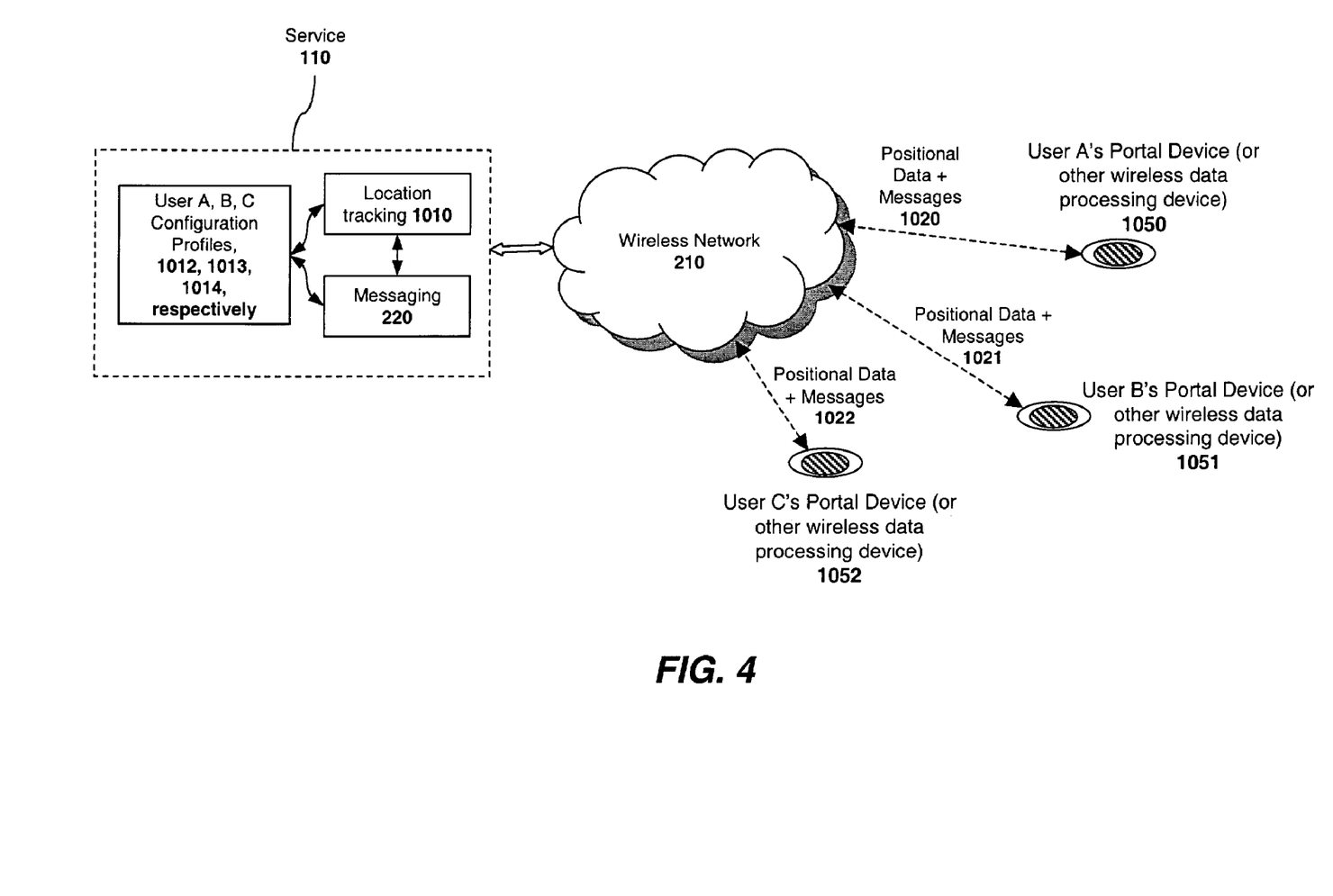
FIG. 4 illustrates one embodiment which includes positional tracking logic for determining positional data related to a data processing device.

Specifically, referring to FIG. 4, in one embodiment of the invention, a location tracking module 1010 executed on the service 100 will monitor the location of each wireless device/user 1050-1052 on the system and transmit the wireless device/user location in response to certain specified events. For example, "User A" may configure his/her wireless device 1050 and/or the service 100 to transmit positional data whenever User A sends a message to other users. User A may also specify a subset of users who should receive positional data when User A transmits a message (e.g., via a "buddy list"). Moreover, User A may specify the types of positional data that users within the subset should receive. For example, User A may specify that "User B" should only receive a measurement of the distance between User A and User B; whereas User C should receive User A's precise location (e.g., 156 University Ave, Palo Alto, Calif.).

In one embodiment, the service 100 transmits positional data to message senders in conjunction with the user/device status information. For example, if a user enters a tunnel, the user's exact location may be transmitted, thereby further informing the sender(s) of the user's status (e.g., "User A has entered the Brooklyn Battery Tunnel; messages will be transmitted once User A is again connected to the network").

User A's preferences with respect to location tracking may be stored in User A's configuration profile 1012 on the service 100. Subsequently, when User A transmits a message (via messaging module 220), the location tracking module 1010 will read User A's specifications from User A's configuration profile 1012 to determine how to format User A's positional data for transmission to User B and/or User C. It should be noted, however, that User A's location may be tracked/transmitted using various levels of precision while still complying with the underlying principles of the invention (e.g., by city, zip code, area code, longitude and latitude, . . . etc).

The location of each wireless device 1050-1052 may be captured using various types of positional technology. For example, certain wireless devices may employ global positioning system ("GPS") techniques for identifying the wireless device's precise coordinates (e.g., using GPS satellites). Once the user's coordinates have been identified, one embodiment of the system will perform a database lookup to locate the specific road, tunnel, building, . . . etc, found at those coordinates (i.e., so that the actual name of the road, tunnel, building may be provided to the sender as opposed to the raw coordinates). If the wireless devices 1050-1052 communicate via a cellular or PCS communications network, the cell from which the user transmits his/her message may be used by the location tracking module 1010 to identify the user's/wireless device's location. Various other known positional tracking technologies may be employed while still complying with the underlying principles of the invention (e.g., wireless triangulation techniques).

Various wireless network types may be employed to support communications between the wireless device 110 and the service 100 including, for example, packet-based networks such as Cellular Digital Packet Data ("CDPD"), the General Packet Radio Service ("GPRS") and Mobitex. It should be noted, however, that the underlying principles of the invention are not limited to any particular type of wireless network 210.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above focus on an instant messaging implementation, the underlying principles of the invention may be implemented using various alternate messaging protocols (e.g., e-mail messaging). Accordingly, the scope and spirit of the invention should be judged in terms of the claims which follow.

What is claimed is:

1. A method, comprising:
    tracking a connection status of a wireless device on a wireless network;
    tracking a current position of said wireless device using one or more position tracking techniques;
    receiving electronic messages from one or more senders, said messages addressed to said wireless device;
    waiting a period of time for said wireless device to move in contact with said wireless network after said wireless device has moved out of contact with said wireless network, and, maintaining a continuous virtual connection with said wireless device for said period of time;
    sending information describing parameters of said connection status to said one or more senders;
    storing a level of precision with which to identify said wireless device's position to each of said one or more senders;
    transmitting positional data identifying said wireless device's position to each of said one or more senders at said specified levels of precision identified for each of said one or more senders;
    storing messages sent to said wireless device;
    transmitting said stored messages to said wireless device and said positional data if said wireless device moves back in contact with said wireless network within said period of time; and
    ending said continuous virtual connection with said wireless device after said period of time if said wireless device does not move back in contact with said wireless network, said stored messages being sent to said wireless device when said wireless device reconnects to said wireless service.

2. The method as in claim 1 wherein real time information related to said connection status is provided only in response to said connection status meeting certain specified criteria.

3. The method as in claim 2 wherein said certain criteria comprises said wireless device being out of contact with said wireless network for a first period of time and wherein said information communicated to said one or more senders is that said wireless device is temporarily out of contact with said wireless network.

4. The method of claim 3 wherein said certain criteria further comprises said wireless device being out of contact for a second period of time following said first period of time and wherein said information communicated to said one or more senders is that said user is logged off of a messaging service supporting said electronic messages.

5. The method of claim 2 wherein said certain criteria comprises user-specified criteria.

6. The method of claim 2 wherein said certain criteria comprises specified, at least in part, by a data service implementing said method.

7. The method of claim 1 wherein said electronic messages comprise instant messages.

8. The method of claim 1 wherein said electronic messages comprise e-mail messages.

9. The method of claim 1 wherein said parameters indicate that said device is powered down and wherein said information communicated to said message senders indicate that said device is powered down.

10. A system comprising:
    a wireless network;
    a data service, said data service to:
    track a connection status of a wireless device on said wireless network;
    track a current Position of said wireless device using one or more position tracking techniques
    store an electronic message sent to said wireless device while said wireless device is out of contact with said wireless network;
    transmit said stored message to said wireless device after said wireless device reconnects to said wireless network;
    said data service implemented with a messaging component, said messaging component to:
    receive electronic messages from one or more senders addressed to said wireless device and to provide information describing said connection status to said one or more senders;
    store a level of precision with which to identify said wireless device's Position to each of said one or more senders;
    transmitting positional data identifying said wireless device's position to each of said one or more senders at said specified levels of precision identified for each of said one or more senders;
    wait a period of time for said wireless device to come in contact with said wireless network after said wireless device has moved out of contact with said wireless network and maintain a continuous virtual connection with said wireless device for said period of time; and
    end said continuous virtual connection with said wireless device after said period of time if said wireless device does not come in contact with said wireless network;

wherein said transmission of said stored message occurs even after said end of said continuous virtual connection.

11. The network of claim 10 wherein said information describing said connection status is provided by said messaging module only in response to said connection status meeting certain criteria.

12. The network of claim 11 wherein said certain criteria comprises said wireless device being out of contact with said wireless network for a first period of time and wherein said information communicated to said one or more senders indicates that said wireless device is temporarily out of contact with said wireless network.

13. The network of claim 12 wherein said certain criteria further comprises said wireless device being out of contact with said wireless network for a second period of time following said first period of time and wherein said information communicated to said one or more senders is that said user is logged off of a messaging service supported by said messaging component.

14. The system of claim 11 wherein said certain criteria comprises user-specified criteria.

15. The system of claim 11 wherein said certain criteria comprises specified by a data service.

16. The system of claim 10 wherein said electronic messages comprises instant messages.

17. The system of claim 10 wherein said electronic messages comprises e-mail messages.

18. The network of claim 10 wherein said connection status is that said device is powered down and wherein said information communicated to said message senders is that said device is powered down.

* * * * *